US009954726B2

(12) United States Patent
Alshinnawi et al.

(10) Patent No.: US 9,954,726 B2
(45) Date of Patent: Apr. 24, 2018

(54) CONTROLLING NETWORKING DEVICE TEMPERATURES BY REDUCING DATA TRANSFER RATES FROM ASSOCIATED NODES

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); Jeffrey S. Holland, Newton, NC (US); Mark McCool, Cary, NC (US); Pradeep Ramineni, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 15/078,529

(22) Filed: Mar. 23, 2016

(65) Prior Publication Data
US 2017/0279666 A1  Sep. 28, 2017

(51) Int. Cl.
| | | |
|---|---|---|
| *H04L 12/24* | (2006.01) | |
| *H04L 1/00* | (2006.01) | |
| *H04L 1/22* | (2006.01) | |
| *H04L 12/935* | (2013.01) | |

(52) U.S. Cl.
CPC ........ *H04L 41/0672* (2013.01); *H04L 1/0002* (2013.01); *H04L 1/22* (2013.01); *H04L 49/3054* (2013.01)

(58) Field of Classification Search
CPC ................. F28F 3/12; F28F 9/26; F28F 13/02
See application file for complete search history.

(56) References Cited

U.S. PATENT DOCUMENTS

| | | | | |
|---|---|---|---|---|
| 8,128,283 | B2 * | 3/2012 | Hosking | G01K 1/16 374/208 |
| 2002/0004912 | A1 * | 1/2002 | Fung | G06F 1/3203 713/300 |
| 2007/0070994 | A1 * | 3/2007 | Burroughs | G06F 1/206 370/381 |
| 2008/0007192 | A1 * | 1/2008 | Williams | H03G 3/3042 318/471 |

* cited by examiner

*Primary Examiner* — Jamal Javaid
(74) *Attorney, Agent, or Firm* — Jeffrey L. Streets

(57) ABSTRACT

A method includes a compute node transmitting data to a port of a first switch at a first data transfer rate, monitoring the temperature of the port, and a management node providing an instruction to the compute node in response to the port temperature exceeding a temperature limit, wherein the instruction instructs the compute node to reduce the first data transfer rate to the port. The method further includes the compute node reducing the data transfer rate to the port in response to receiving the instruction. The method is applicable to multiple compute nodes transmitting data to multiple ports of a first switch. The data transfer rate may be reduced by throttling the compute node, renegotiating a link speed between the compute node and the port, or redirecting data to another switch. The methods facilitate thermal control of a switch without its own thermal throttling capability.

19 Claims, 3 Drawing Sheets

22

Management Node – Network Data

| Switch | Port | Port Temp. | Node | NIC | NIC Temp. | Link Speed | Data Transfer Rate |
|---|---|---|---|---|---|---|---|
| X | 1 | Hot | A | 1 | Normal | 9 Gbps | 9 Gbps |
| X | 2 | Normal | B | 1 | Normal | 9 Gbps | 5 Gbps |
| X | 3 | Normal | C | 1 | Normal | 9 Gbps | 3 Gbps |
| Y | 1 |  | A | 2 |  | 9 Gbps |  |
| Y | 2 |  | B | 2 |  | 9 Gbps |  |
| Y | 3 |  | C | 2 |  | 9 Gbps |  |

62 — A compute node transmitting data to a port of a first switch at a first data transfer rate 64 — Monitoring the temperature of the port 66 — A management node providing an instruction to the compute node in response to the port temperature exceeding a temperature limit, wherein the instruction instructs the compute node to reduce the first data transfer rate to the port 68 — The compute node reducing the data transfer rate to the port in response to receiving the instruction

FIG. 3

CONTROLLING NETWORKING DEVICE TEMPERATURES BY REDUCING DATA TRANSFER RATES FROM ASSOCIATED NODES

BACKGROUND

Field of the Invention

The present invention relates to temperature control in a networking device such as a network switch.

Background of the Related Art

Networking devices like switches used in various types of networks, such as Fibre Channel, Infiniband and Ethernet, do not have the ability to perform thermal throttling. Switches also dissipate about 80-90% of their total power rating once the ports are online, depending on the application, irrespective of whether the ports are being used or not. Unlike central processing units (CPUs) and memory, these networking devices do not have a built-in throttling capability to operate at lower frequency or power state with an acceptable performance impact.

In fan failure modes, higher ambient temperatures and higher elevations, networking devices tend to run at higher operating temperatures. In some instances, these higher operating temperatures can lead to higher leakage current resulting in thermal runaway. When a typical networking device in a datacenter rack or multi-node chassis has insufficient cooling and exceeds a temperature limit, the networking device is designed to shut down. High temperatures may also result in component damage, a reduction in reliability, high bit error rates (BER) or data loss.

Cooling systems for a switch or input/output (I/O) device are typically designed to meet a known set of cooling requirements. However, once the switch or I/O device has been shipped and installed, the cooling system may be used in a more thermally-challenging operating environment than the switch or I/O device was designed to handle. Sometimes an existing switch or I/O device is used, without modification, in a new chassis under different operating conditions in order to avoid additional development or material costs. Furthermore, there is questionable value in customizing a cooling system for every single operating environment just so that the switch or I/O device will remain fully functional under certain unusually strenuous operating conditions. Still, these networking devices need to remain functional regardless of the operating conditions, such as a fan failure or high temperature ambient conditions, even if performance is negatively impacted.

BRIEF SUMMARY

One embodiment of the present invention provides a method comprising a compute node transmitting data to a port of a first switch at a first data transfer rate, monitoring the temperature of the port, and a management node providing an instruction to the compute node in response to the port temperature exceeding a temperature limit, wherein the instruction instructs the compute node to reduce the first data transfer rate to the port. The method further comprises the compute node reducing the data transfer rate to the port in response to receiving the instruction.

Another embodiment of the present invention provides a method comprising a plurality of compute nodes transmitting data to a plurality of ports of a first switch, monitoring a temperature of each of the ports, and a management node providing an instruction to a first compute node in response to a temperature of a first port exceeding a temperature limit, wherein the first compute node is transmitting data to the first port and the instruction instructs the compute node to reduce a data transfer rate to the port. The method further comprises the first compute node reducing the data transfer rate to the first port in response to receiving the instruction.

Yet another embodiment of the present invention provides a computer program product comprising a non-transitory computer readable storage medium having program instructions embodied therewith, wherein the program instructions are executable by one or more processors to cause the one or more processors to perform a method. The method comprises a compute node transmitting data to a port of a first switch at a first data transfer rate, monitoring the temperature of the port, and a management node providing an instruction to the compute node in response to the port temperature exceeding a temperature limit, wherein the instruction instructs the compute node to reduce the first data transfer rate to the port. The method further comprises the compute node reducing the data transfer rate to the port in response to receiving the instruction.

BRIEF DESCRIPTION OF THE SEVERAL VIEWS OF THE DRAWINGS

FIG. 2 is a table representative of network data available to the management node for use according to various embodiments of the present invention.

FIG. 3 is a flowchart of a method according to one embodiment of the present invention.

DETAILED DESCRIPTION

Figure 1:
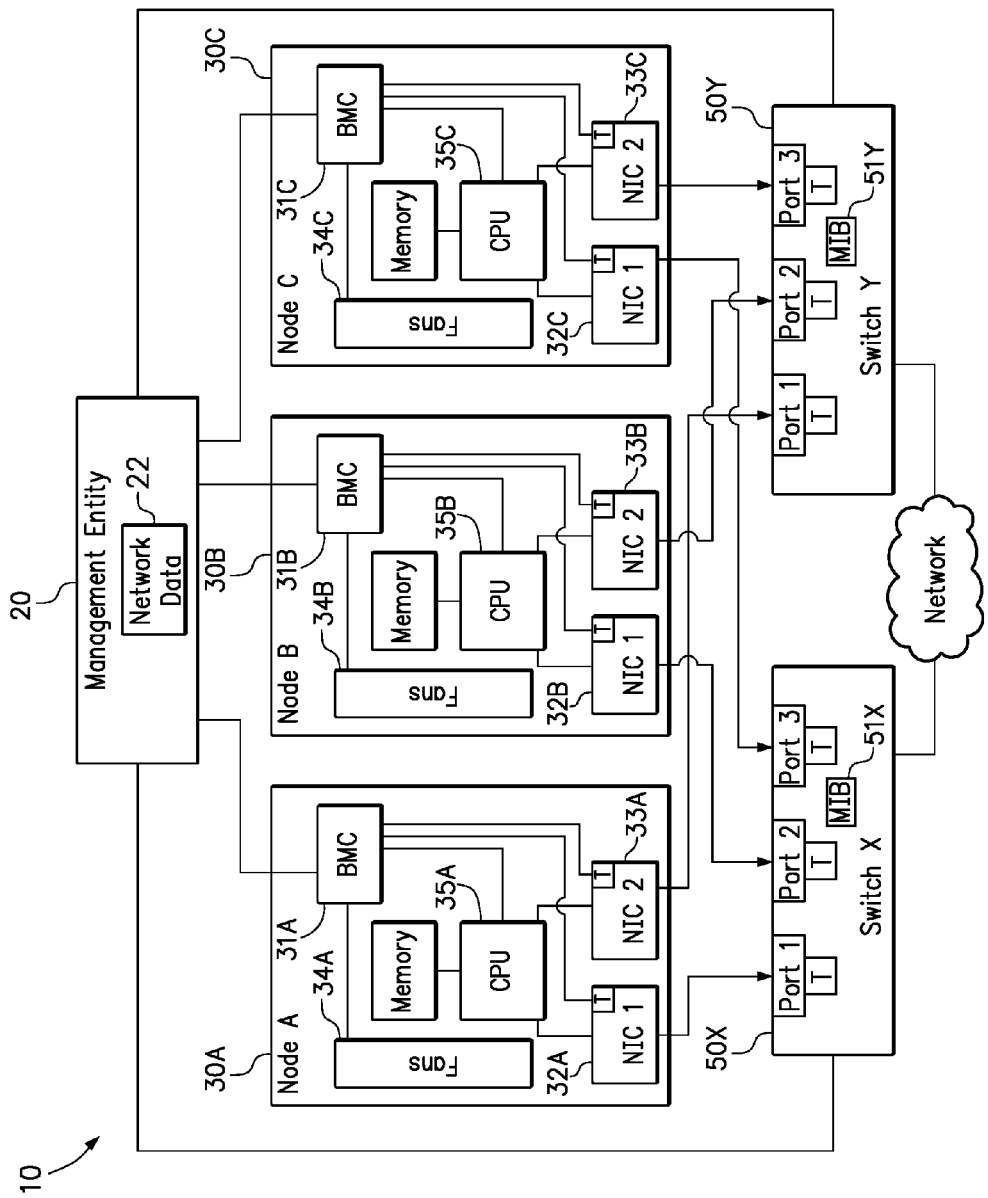
FIG. 1 is a diagram of a computer system that may perform embodiments of the present invention.

One embodiment of the present invention provides a method comprising a compute node transmitting data to a port of a first switch at a first data transfer rate, monitoring the temperature of the port, and a management node providing an instruction to the compute node in response to the port temperature exceeding a temperature limit, wherein the instruction instructs the compute node to reduce the first data transfer rate to the port. The method further comprises the compute node reducing the data transfer rate to the port in response to receiving the instruction.

The compute node, the management node and the first switch may be included in a network that includes other entities. Typically, the compute node will be one of a plurality of compute nodes in a network that may include multiple switches. For example, a plurality of compute nodes, a management node and two switches may be included in a multi-node chassis, such as a blade server chassis. Optionally, each compute node may include a first network interface controller (NIC) for communication with a first port of a first switch and a second NIC for communication with a second port of a second switch. Using a NIC, a compute node may transmit data to a port of the first switch at a data transfer rate that is supportable by both the compute node and the first switch. While a switch or management node is not able to directly throttle the port, the management node instructs the compute node to reduce its data transfer rate to the port in response to the port temperature exceeding a temperature limit. The management node may obtain the port temperature, or a temperature alarm signal, in various manners, such as reading a management information base (MIB) record maintained by the first switch. Optionally, the method may, prior to reducing the data transfer rate to the port, determine that fans within the first switch are operating at a maximum fan speed setpoint. Such maximum fan speed setpoint may be set at the highest operational fan speed or at a reduced fan speed, such as in an acoustic mode in which the maximum fan speed setpoint in less than the highest operational fan speed of the fan.

The port temperature may be measured in various locations, such as the temperature of a transceiver case for the port, and may be communicated to the management node through various communication channels, such as recording the port temperature in an accessible management information base.

In one embodiment, the compute node reduces the data transfer rate to the port by throttling operation of the compute node. For example, in response to receiving an instruction from the management node, the compute node may throttle operation of the compute node by throttling a processor within the compute node. Since the processor processes fewer instructions per second, the data transfer rate to the port may be reduced.

In another embodiment, the compute node reduces the data transfer rate to the port by renegotiating a link speed between the compute node and the port of the first switch. As used herein, the term "link speed" refers to the maximum supported data transfer rate between the compute node and the port, regardless of whether data is being transferred at that rate. For example, the renegotiated link speed may be less than a previous link speed that was used while the temperature of the port exceeded the temperature limit. Accordingly, the data transfer rate must be less than or equal to the reduced link speed. The process of renegotiating the link speed between the compute node and the port of the first switch may include the compute node advertising a maximum supported data transfer rate that is reduced from a previously advertised maximum supported data transfer rate, then forcing the link down, and then bringing the link back up.

One example of a 10 Gbps (gigabits per second) embedded switch is provided to illustrate how much power consumption can be reduced by renegotiating the link speed. The table below shows the power consumption of a 10 Gbps embedded switch operating at an ambient air temperature of 50° C. under three different data transfer rates—idle, 1 Gbps and 9 Gbps.

| Traffic Tests | Power (W) |
| --- | --- |
| Idle | 132 |
| 1 Gb | 135 |
| 9 Gb | 143 |

The power consumption of the scalable switch element (ScSE) may be lowered by 8 W going from 9 Gbps to 1 Gbps traffic. It is expected that networking devices will soon support link speeds of 40 Gbps and 100 Gbps. Given the measurements from currently shipping 10 Gbps technology, the expectation is that the power savings would be much higher when link speeds are negotiated down from 100 Gbps to 40 Gbps and from 40 Gbps to 10 Gbps. These power savings would help to keep the network device operating below thermal limits and ensure reliable operation of the networking device at lower speeds with performance reduction in thermally stressful environments preventing customer data loss.

In yet another embodiment, the compute node reduces the data transfer rate to the port by redirecting data transmission away from the first switch to a second switch. For example, the compute node may redirect the data transmission away from the first switch to the second switch by redirecting the data from a first network interface controller coupled with the first switch to a second network interface controller coupled with the second switch. In one option, the method may further include determining, prior to redirecting the data transmission to the second network interface controller coupled with the second switch, that the second switch has a temperature that does not exceed a temperature limit of the second switch. Most preferably, the determination verifies that a second port of the second switch does not have a temperature that exceeds a temperature limit of the second port, wherein the second port is coupled to the second network interface controller.

While embodiments of the present invention may be implemented to provide thermal protection to stand-alone switches, the disclosed methods are particularly well-suited for embedded switches, and especially those embedded switches that do not have active cooling. For example, an embedded switch may be included within a multi-node chassis along with a plurality of compute nodes, a management module and power supplies. In some implementations, an embedded switch may connect through a backplane to NIC adapters in a plurality of blade servers. Furthermore, the method may further monitor the temperature of the NIC and reduce the data transfer rate through the NIC in response to a NIC temperature exceeding a NIC temperature limit. For example, data transmission may be redirected through a second NIC within the same compute node or a processor within the same compute node may be throttled.

The management node may obtain information about the operation of the switch, such as how many ports are being used by the switch, which port is being used for data transmission by which compute nodes and at what data transfer rates, and the temperature of a plurality of thermally critical components of the switch. Furthermore, the management node may access or identify network topology information for a network including the compute node and the switch. For example, the network topology information may identify how the data is routed from each compute node to certain ports of certain switches. The network topology information preferably also identifies redundancy within the switch, redundancy between switches, and redundant connections to each compute node. The network topology information informs the management node about the options that are available for redirecting data. Optionally, the method may further include consolidating data transmission on fewer ports to operate at max band width/higher link speeds, and then shutting down ports that are not being used.

The management node may further identify a priority associated with the data coming from certain nodes, and may send the highest priority data over certain ports on the switch. Optionally, a user may provide user preferences that assign priorities to various tasks. The method may then include throttling a first compute node performing a first task before throttling a second compute node performing a second task having a higher priority that the first task.

The methods of the present invention may further include re-routing traffic among external (uplink) ports, either to consolidate traffic on fewer ports, load balance the traffic across a greater number of ports, or simply direct traffic to a higher/lower bandwidth port or lower temperature port. A typical method for re-routing ports on a switch is by controlling virtual local area network (VLAN) membership, which influences which uplink ports are accessible by the downlink ports to the compute nodes. A full picture of the uplink topology may be known to the management node so that it can make use of redundant uplink paths. In other words, re-routing paths (by VLAN) is beneficial when the 'cooler' ports being re-routed to, have upstream connections from the switch that are redundant to the paths of the hot ports.

Another embodiment of the present invention provides a method comprising a plurality of compute nodes transmitting data to a plurality of ports of a first switch, monitoring a temperature of each of the ports, and a management node providing an instruction to a first compute node in response to a temperature of a first port exceeding a temperature limit, wherein the first compute node is transmitting data to the first port and the instruction instructs the first compute node to reduce a data transfer rate to the first port. The method further comprises the first compute node reducing the data transfer rate to the first port in response to receiving the instruction. For example, the first compute node may reduce the data transfer rate to the first port in various ways, consistent with those described previously, including throttling operation of the first compute node, renegotiating a link speed between the first compute node and the first port of the first switch, or redirecting data transmission away from the first switch to a second switch. Other aspects of the previously described methods involving a single compute node, may be implemented in the context of the present method involving a plurality of compute nodes. Still further, where throttling a single compute node, redirecting data transmission from a single compute node, or renegotiating link speed with a single compute node does not result in a sufficient reduction in temperature of a given port or the entire switch, then the method may further include throttling additional compute nodes that are transmitting data to the switch, redirecting data transmission from additional compute nodes or renegotiating link speed with additional compute nodes.

Yet another embodiment of the present invention provides a computer program product comprising a non-transitory computer readable storage medium having program instructions embodied therewith, wherein the program instructions are executable by one or more processors to cause the one or more processors to perform a method. The method comprises a compute node transmitting data to a port of a first switch at a first data transfer rate, monitoring a temperature of the port, and a management node providing an instruction to the compute node in response to the port temperature exceeding a temperature limit, wherein the instruction instructs the compute node to reduce the first data transfer rate to the port. The method further comprises the compute node reducing the data transfer rate to the port in response to receiving the instruction.

The foregoing computer program products may further include computer readable program code for implementing or initiating any one or more aspects of the methods described herein. Accordingly, a separate description of the methods will not be duplicated in the context of a computer program product.

FIG. 1 is a diagram of a computer system 10 that may perform embodiments of the present invention. The computer system 10 includes a management entity or node 20, a plurality of compute nodes 30 (i.e., Node A 30A, Node B 30B, and Node C 30C) and a plurality of switches 50 (i.e., Switch X 50X, and Switch Y 50Y). The management node 20 is in communication with a baseboard management controller (BMC) 31 (i.e., BMC 31A, BMC 31B, and BMC 31C) of each compute node, and in communication with each switch 50 (i.e., Switch X 50X, and Switch Y 50Y). In addition, each compute node 50 includes a first network interface controller 32 (i.e., NIC 1 32A, NIC 1 32B, and NIC 1 32C) and a second network interface controller (i.e., NIC 2 33A, NIC 2 33B, and NIC 2 33C), where each first NIC (NIC 1 ) is coupled to a port of the first switch (Switch X 50X) and each second NIC (NIC 2 ) is coupled to a port of the second switch (Switch Y 50Y). By way of example, this allows Node A 30A to communication data to the network using either NIC 1 32A to transmit data to Port 1 of Switch X 50X or NIC 2 33A to transmit data to Port 1 of Switch Y 50Y.

During operation, each switch maintains a management information base (MIB) 51 (i.e., MIB 51X and MIB 51Y) that may indicate, for each port of the respective switch, the identity of any compute node transmitting data to the port, the data transfer rate, and a port temperature T. Accordingly, each switch may share the contents of the MIB with the management node 20, which may store the MIB data along with network topology information as "network data" 22. Accordingly, in response to a port temperature exceeding a temperature limit, the management node 20 may provide an instruction to the BMC 31 of a particular compute node 30 that is transmitting data to the port. The BMC 31 may verify that the fans 34 (i.e., fans 34A, fans 34B, or fans 34C) of the particular compute node are operational or at their maximum fan speed, and may cause the CPU 35 (i.e., CPU 35A, CPU 35B, or CPU 35C) to take steps to reduce the data transfer rate to the port. For example, the CPU may itself be throttled, the CPU (or BMC) may cause the NIC coupled to the port to renegotiate the link speed, or the CPU may redirect data transmission through the other NIC to the other switch. Furthermore, the BMC of each node may monitor the temperature of each NIC in each node and, for example, redirect data transmission through a second NIC of a node in response to the first NIC having a temperature exceeding a temperature limit. Various embodiments and optional features of the present invention may be implemented on the computer system 10 and similar computer systems. Specifically, the present invention is not limited to any particular number of compute nodes or switches.

FIG. 2 is a table representative of network data 22 available to the management node 20 (See FIG. 1) for use according to various embodiments of the present invention. Beginning with the columns on the left and moving to the columns on the right, the table identifies each switch and port number, and whether the port temperature is hot or normal. While the network data may include an actual temperature measurement, the term "hot" is simply used to indicate that the port temperature exceeds a temperature limit such that action should be taken. Furthermore, the columns of the table identify the node and NIC that are associated (i.e., in the same record/row) with each switch port, and the NIC temperature. Then, the columns identify the link speed (i.e., maximum data transfer rate) for the link between the switch port and the node, and the actual data transfer rate for the link.

In the example provided in the table, note that the Switch X, Port 1 is coupled to Node A, NIC 1 and is running "Hot". Since the data transfer rate to Switch X, Port 1 is running at 9 Gbps (i.e., equal to the negotiated link speed), there is room to reduce the data transfer rate to the port in order to reduce the temperature. Therefore, a management node may instruct Node A to throttle its processor in order to reduce the actual data transfer rate, redirect data transmission through NIC 2 to Port 1 of Switch Y, or renegotiate the link speed to something lower than 9 Gbps.

FIG. 3 is a flowchart of a method 60 according to one embodiment of the present invention. In step 62, the method includes a compute node transmitting data to a port of a first switch at a first data transfer rate. Step 64 includes monitoring the temperature of the port, and step 66 includes a management node providing an instruction to the compute node in response to the port temperature exceeding a temperature limit, wherein the instruction instructs the compute node to reduce the first data transfer rate to the port. In step 68, the compute node reduces the data transfer rate to the port in response to receiving the instruction.

Figure 4:
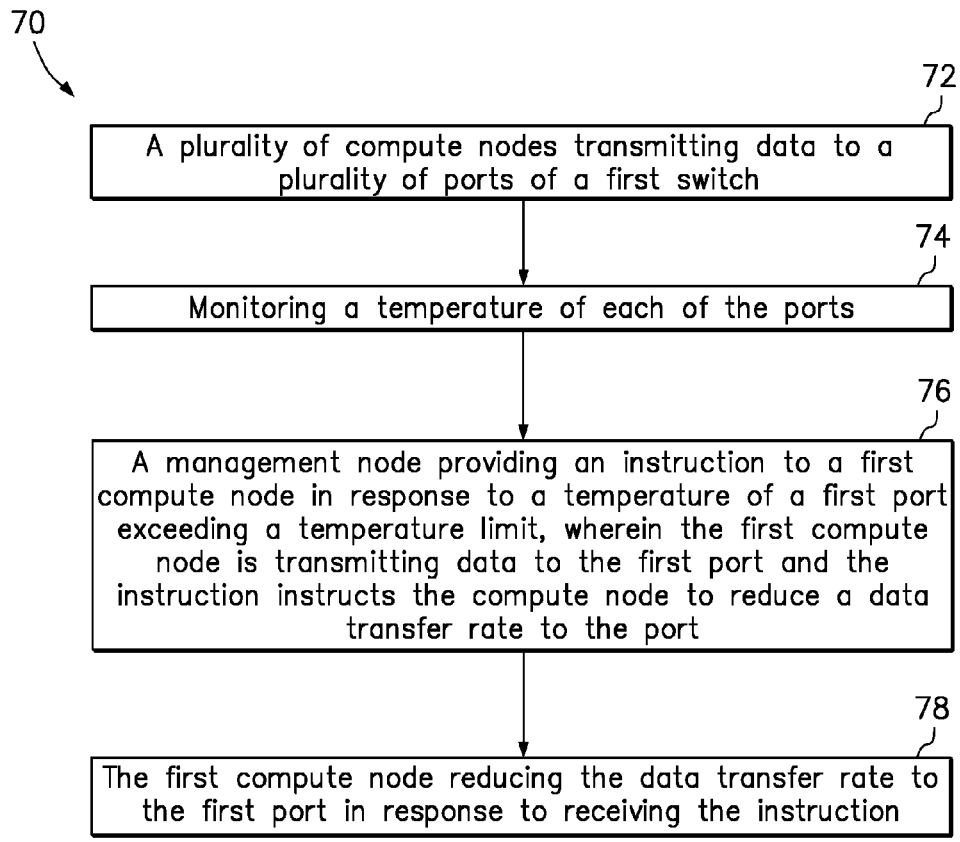
FIG. 4 is a flowchart of a method according to another embodiment of the present invention.

FIG. 4 is a flowchart of a method 70 according to another embodiment of the present invention. In step 72, the method includes a plurality of compute nodes transmitting data to a plurality of ports of a first switch. Step 74 includes monitoring a temperature of each of the ports, and step 76 includes a management node providing an instruction to a first compute node in response to a temperature of a first port exceeding a temperature limit, wherein the first compute node is transmitting data to the first port and the instruction instructs the compute node to reduce a data transfer rate to the port. In step 78, the first compute node reduces the data transfer rate to the first port in response to receiving the instruction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    a compute node transmitting data to a port of a first switch at a first data transfer rate;
    monitoring the temperature of the port;
    a management node providing an instruction to the compute node in response to the port temperature exceeding a temperature limit, wherein the instruction instructs the compute node to reduce the first data transfer rate to the port; and
    the compute node reducing the data transfer rate to the port in response to receiving the instruction, wherein the compute node reduces the data transfer rate to the port by redirecting data transmission away from the first switch to a second switch.

2. The method of claim 1, further comprising:
    determining, prior to reducing the data transfer rate to the port, that fans within the first switch are operating at a maximum fan speed setpoint.

3. The method of claim 1, wherein the port temperature is the temperature of a transceiver case for the port.

4. The method of claim 1, wherein the compute node reducing the data transfer rate to the port further includes renegotiating a link speed between the compute node and the port of the first switch, wherein the link speed limits the data transfer rate between the compute node and the port, and wherein the renegotiated link speed is less than a previous link speed that was used while the temperature of the port exceeded the temperature limit.

5. The method of claim 4, wherein renegotiating the link speed between the compute node and the port of the first switch includes the compute node advertising a maximum supported data transfer rate that is reduced from a previously advertised maximum supported data transfer rate, then forcing the link down, and then bringing the link back up.

6. The method of claim 1, wherein redirecting the data transmission away from the first switch to the second switch includes the compute node redirecting the data from a first network interface controller coupled with the first switch to a second network interface controller coupled with the second switch.

7. The method of claim 6, further comprising:
    determining, prior to redirecting the data transmission to the second network interface controller coupled with the second switch, that the second switch has a temperature that does not exceed a temperature limit of the second switch.

8. A method, comprising:
    a plurality of compute nodes transmitting data to a plurality of ports of a first switch;
    monitoring a temperature of each of the ports;
    a management node providing an instruction to a first compute node in response to a temperature of a first port exceeding a temperature limit, wherein the first compute node is transmitting data to the first port and the instruction instructs the first compute node to reduce a data transfer rate to the first port; and
    the first compute node reducing the data transfer rate to the first port in response to receiving the instruction, wherein the first compute node reduces the data transfer rate to the first port by redirecting data transmission away from the first switch to a second switch.

9. The method of claim 8, wherein the first compute node reducing the data transfer rate to the first port further includes renegotiating a link speed between the first compute node and the first port of the first switch, wherein the link speed limits the data transfer rate between the first compute node and the first port, and wherein the renegotiated link speed is less than a previous link speed that was used while the temperature of the first port exceeded the temperature limit.

10. The method of claim 9, wherein renegotiating the link speed between the first compute node and the first port of the first switch includes the first compute node advertising a maximum supported data transfer rate that is reduced from a previously advertised supported data transfer rate, then forcing the link down, and then bringing the link back up.

11. The method of claim 8, wherein redirecting data transmission away from the first switch to the second switch includes the compute node redirecting data transmission from a first network interface controller coupled with the first switch to a second network interface controller coupled with the second switch.

12. The method of claim 8, wherein the first and second switches are included in a multi-node chassis along with the plurality of compute nodes.

13. A computer program product comprising a non-transitory computer readable storage medium having program instructions embodied therewith, the program instructions executable by one or more processors to:

transmit data from a compute node to a port of a first switch at a first data transfer rate;

monitor the temperature of the port;

provide an instruction to the compute node in response to the port temperature exceeding a temperature limit, wherein the instruction instructs the compute node to reduce the first data transfer rate to the port; and reduce the data transfer rate from the computer node to the port in response to receiving the instruction, wherein the compute node reduces the data transfer rate to the port by redirecting data transmission away from the first switch to a second switch.

14. The computer program product of claim 13, wherein redirecting the data transmission away from the first switch to the second switch includes redirecting the data from a first network interface controller coupled with the first switch to a second network interface controller coupled with the second switch.

15. The computer program product of claim 13, wherein the first and second switches are included in a multi-node chassis along with the plurality of compute nodes.

16. The computer program product of claim 13, wherein the program instructions are further executable by one or more processors to:

determine, prior to reducing the data transfer rate to the port, that fans within the first switch are operating at a maximum fan speed setpoint.

17. The computer program product of claim 13, wherein the compute node reducing the data transfer rate to the port further includes renegotiating a link speed between the compute node and the port of the first switch, wherein the link speed limits the data transfer rate between the compute node and the port, and wherein the renegotiated link speed is less than a previous link speed that was used while the temperature of the port exceeded the temperature limit.

18. The method of claim 1, wherein the compute node, the management node, the first switch and the second switch are included in a multi-node chassis.

19. The method of claim 8, wherein the plurality of compute nodes, the management node, the first switch and the second switch are included in a multi-node chassis.

* * * * *